US010705697B2

(12) United States Patent
Kusumoto

(10) Patent No.: US 10,705,697 B2
(45) Date of Patent: Jul. 7, 2020

(54) INFORMATION PROCESSING APPARATUS CONFIGURED TO EDIT IMAGES, NON-TRANSITORY COMPUTER-READABLE MEDIUM STORING INSTRUCTIONS THEREFOR, AND INFORMATION PROCESSING METHOD FOR EDITING IMAGES

(71) Applicant: BROTHER KOGYO KABUSHIKI KAISHA, Nagoya, Aichi (JP)

(72) Inventor: Naoki Kusumoto, Aichi (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 121 days.

(21) Appl. No.: 15/467,008

(22) Filed: Mar. 23, 2017

(65) Prior Publication Data
US 2017/0285921 A1    Oct. 5, 2017

(30) Foreign Application Priority Data

Mar. 31, 2016    (JP) ................. 2016-071922

(51) Int. Cl.
*G06F 3/0484* (2013.01)
*G06F 3/0488* (2013.01)
*G06F 3/0482* (2013.01)

(52) U.S. Cl.
CPC ........ *G06F 3/04845* (2013.01); *G06F 3/0482* (2013.01); *G06F 3/0488* (2013.01); *G06F 3/04883* (2013.01); *G06F 2203/04808* (2013.01)

(58) Field of Classification Search
CPC .............. G06F 3/04845; G06F 3/0488; G06F 3/04883; G06F 2203/04808; G06F 3/0482; G06T 2200/24
(Continued)

(56) References Cited

U.S. PATENT DOCUMENTS 8,933,888 B2 * 1/2015 Laubach ............. G06F 3/04812
345/168
9,507,513 B2 * 11/2016 Gordon ............... G06F 3/04883
(Continued)

FOREIGN PATENT DOCUMENTS

JP    2006-146515 A    6/2006
JP    2013-8326 A    1/2013
(Continued)

OTHER PUBLICATIONS

"Adobe Photoshop & Photoshop Elements Tips Cropping an Image in Adobe Photoshop." Internet: https://web.archive.org/web/20150312231752/http:/akvis.com/en/photoshop-tips/crop-image.php, Mar. 12, 2015 [Oct. 4, 2018].*
(Continued)

*Primary Examiner* — Daniel Samwel
(74) *Attorney, Agent, or Firm* — Scully, Scott, Murphy & Presser, P.C.

(57) ABSTRACT

An non-transitory computer-readable storage stores instructions which cause a controller to display an image represented by image data, edit the displayed image through a first indicator, determine whether the first indicator is in a holding state at a certain indicating position on a touch panel, determine whether a second indicator makes a particular contact at another position which is different from the position indicated by the first indicator in the holding state, and confirm the image which has been edited and is currently displayed on the display.

19 Claims, 10 Drawing Sheets

(58) Field of Classification Search
USPC .................................................. 715/700–866
See application file for complete search history.

(56) References Cited

U.S. PATENT DOCUMENTS

| | | | | |
|---|---|---|---|---|
| 9,678,590 | B2* | 6/2017 | Nakayama | G06F 3/0414 |
| 10,452,259 | B1* | 10/2019 | Eischeid | G06F 3/041 |
| 2004/0021643 | A1* | 2/2004 | Hoshino | G06F 3/016 345/173 |
| 2004/0056869 | A1* | 3/2004 | Jetha | G06F 3/04845 345/620 |
| 2005/0104897 | A1* | 5/2005 | Walker, Jr. | G06F 3/04845 345/620 |
| 2007/0109279 | A1* | 5/2007 | Sigona | G06F 3/0418 345/177 |
| 2008/0225057 | A1* | 9/2008 | Hertzfeld | G06F 3/04845 345/619 |
| 2008/0278455 | A1* | 11/2008 | Atkins | G06F 3/04883 345/173 |
| 2010/0053342 | A1* | 3/2010 | Hwang | H04N 5/2259 348/207.99 |
| 2010/0079405 | A1* | 4/2010 | Bernstein | G06F 3/04883 345/174 |
| 2011/0014983 | A1* | 1/2011 | Miller, IV | G06F 3/0488 463/37 |
| 2011/0060985 | A1* | 3/2011 | Kerr | G06F 3/04812 715/702 |
| 2012/0289290 | A1* | 11/2012 | Chae | G06F 3/0488 455/566 |
| 2012/0293551 | A1* | 11/2012 | Momeyer | G06F 3/0488 345/633 |
| 2014/0101587 | A1 | 4/2014 | Sekine | |
| 2014/0132555 | A1* | 5/2014 | Becouarn | G06F 3/0488 345/174 |
| 2014/0278173 | A1* | 9/2014 | Elia | G01R 35/007 702/65 |
| 2015/0130724 | A1* | 5/2015 | Feng | G06F 3/04883 345/173 |
| 2015/0151204 | A1* | 6/2015 | Yamaguchi | A63F 13/825 463/31 |
| 2015/0334290 | A1 | 11/2015 | Akaho | |
| 2016/0378236 | A1 | 12/2016 | Katsuki et al. | |

FOREIGN PATENT DOCUMENTS

| | | | | |
|---|---|---|---|---|
| JP | 5326802 B2 * | 10/2013 | | G06F 3/0481 |
| JP | 2014-75044 A | 4/2014 | | |
| JP | 2014-146127 A | 8/2014 | | |
| JP | 2014-174767 A | 9/2014 | | |
| WO | WO-2008030976 A2 * | 3/2008 | | G06F 3/0488 |
| WO | WO-2013001779 A1 * | 1/2013 | | G06F 3/0414 |
| WO | 2013/161424 A1 | 10/2013 | | |
| WO | 2015/145542 A1 | 10/2015 | | |

OTHER PUBLICATIONS

Ford, Tim. "Tip of the Week—Aug. 8, 2014: Watch That Horizon Line!" Internet: Aug. 8, 2014 [Oct. 10, 2018].*
"https://www.google.com/imgres?imgurl=https%3A%2F%2Ftimfordphoto.com%2Fwp-content%2Fuploads%2F2013%2F09%2Frotate.jpg&imgrefurl=https%3A%2F%2Ftimfordphoto.com%2Ftip-of-the-week-august-8th-2014-watch-that-horizon-, line%2F&docid=cZ6uxFgb6EFuAM&tbnid=NTRCzO8NKiCz1M%3A&vet=10ahUKEwiL2Yv17vvdAhUHj1kKHWY8B74QMwiVAShL".*
"iOS 8 Photo Editing Tools: Cropping & Rotating Images Explained." Internet: https://web.archive.org/web/20150312231752/http://akvis.com/en/photoshop-tips/crop-image.php, Mar. 5, 2015 [Oct. 9, 2018].*
Japanese Notification of Reasons for Rejection dated Oct. 23, 2019 received in Japanese Application No. 2016-071922, together with an English-language translation.

* cited by examiner

INFORMATION PROCESSING APPARATUS CONFIGURED TO EDIT IMAGES, NON-TRANSITORY COMPUTER-READABLE MEDIUM STORING INSTRUCTIONS THEREFOR, AND INFORMATION PROCESSING METHOD FOR EDITING IMAGES

CROSS-REFERENCE TO RELATED APPLICATIONS

This application claims priority under 35 U.S.C. § 119 from Japanese Patent Application No. 2016-071922 filed on Mar. 31, 2016. The entire subject matter of the application is incorporated herein by reference.

BACKGROUND

Technical Field

The present disclosures relate to a technique of editing a displayed image with an operation through a touch panel.

Related Art

There has been known an information processing apparatus which is configured such that various editing operations can be applied to an image displayed on a screen through a touch panel (e.g., a scaling with use of two fingers).

SUMMARY

When an image is edited with use of fingers or other indicators through the touch panel, generally, while the indicator is contacting the touch panel, an editing operation according to a position of the indicator is applied. Further, when the indicating body is released from the touch panel, the image when the indicating body is released is confirmed as the edited image (i.e., the image to which edition has completed).

However, when the information processing apparatus is configured such that the edited contents when the indicator is released is confirmed (regarded as the final image), there may be a condition that the indicator is inadvertently blurred in a direction parallel with a surface of the touch panel, and an image which is different from the user's intent may be confirmed as the finally edited image.

According to aspects of the disclosures, there is provided an non-transitory computer-readable storage of an information processing apparatus having a display, a touch panel overlaid on a display area of the display and configured to detect at least one of a contact and a closely located state of each of multiple indicators and output a detection signal, a data storage configured to store image data, and a controller, the storage storing instructions to be executed by the controller. The instructions, when executed by the controller, cause the information processing apparatus to display on the display an image represented by the image data stored in the data storage, edit the image displayed on the display in accordance with an editing operation, through a first indicator, of the image displayed on the display, determine whether the first indicator is in a holding state at a certain indicating position on the touch panel. When it is determined that the first indicator is in the holding state, the instructions cause the information processing apparatus to determine whether a second indicator makes a particular contact at another position, which is different from the position indicated by the first indicator in the holding state. Further, when it is determined that the particular contact has been made to the other position by the second indicator, the instructions cause the information processing apparatus to determine the image which has been edited and is currently displayed on the display as an edited image.

According to aspects of the disclosures, there is provided an information processing apparatus which is provided with a display, a touch panel overlaid on a display area of the display and configured to detect at least one of a contact and a closely located state of each of multiple indicators and output a detection signal, a data storage configured to store image data and a controller. The controller is configured to display an image represented by the image data stored in the data storage, edit the image displayed on the display in accordance with an editing operation, through a first indicator, of the image displayed on the display, and determine whether the first indicator is in a holding state at a certain indicating position on the touch panel. Further, the controller is configured to, when it is determined that the first indicator is in the holding state, determine whether a second indicator makes a particular contact at another position, which is different from the position indicated by the first indicator in the holding state. Further, when it is determined that the particular contact has been made to the other position by the second indicator, the controller confirms the image which has been edited and is currently displayed on the display.

According to aspects of the disclosures, there is provided an information processing method employed in an information processing apparatus which has a display, a touch panel overlaid on a display area of the display and configured to detect at least one of a contact and a closely located state of each of multiple indicators and output a detection signal, and a data storage configured to store image data. The method includes displaying an image represented by the image data stored in the data storage, editing the image displayed on the display in accordance with an editing operation, through a first indicator, of the image displayed on the display, and determining whether the first indicator is in a holding state at a certain indicating position on the touch panel. The method further includes, when it is determined that the first indicator is in the holding state, determining whether a second indicator makes a particular contact at another position, which is different from the position indicated by the first indicator in the holding state. The method further includes, when it is determined that the particular contact has been made to the other position by the second indicator, confirming the image which has been edited and is currently displayed on the display.

BRIEF DESCRIPTION OF THE ACCOMPANYING DRAWINGS

DESCRIPTION OF THE ILLUSTRATIVE EMBODIMENT

Hereinafter, referring to the accompanying drawings, an illustrative embodiment according to the disclosures will be described.

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storages, hard disk drives, floppy drives, permanent storages, and the like.

General Description of Image Processing System

Figure 1:
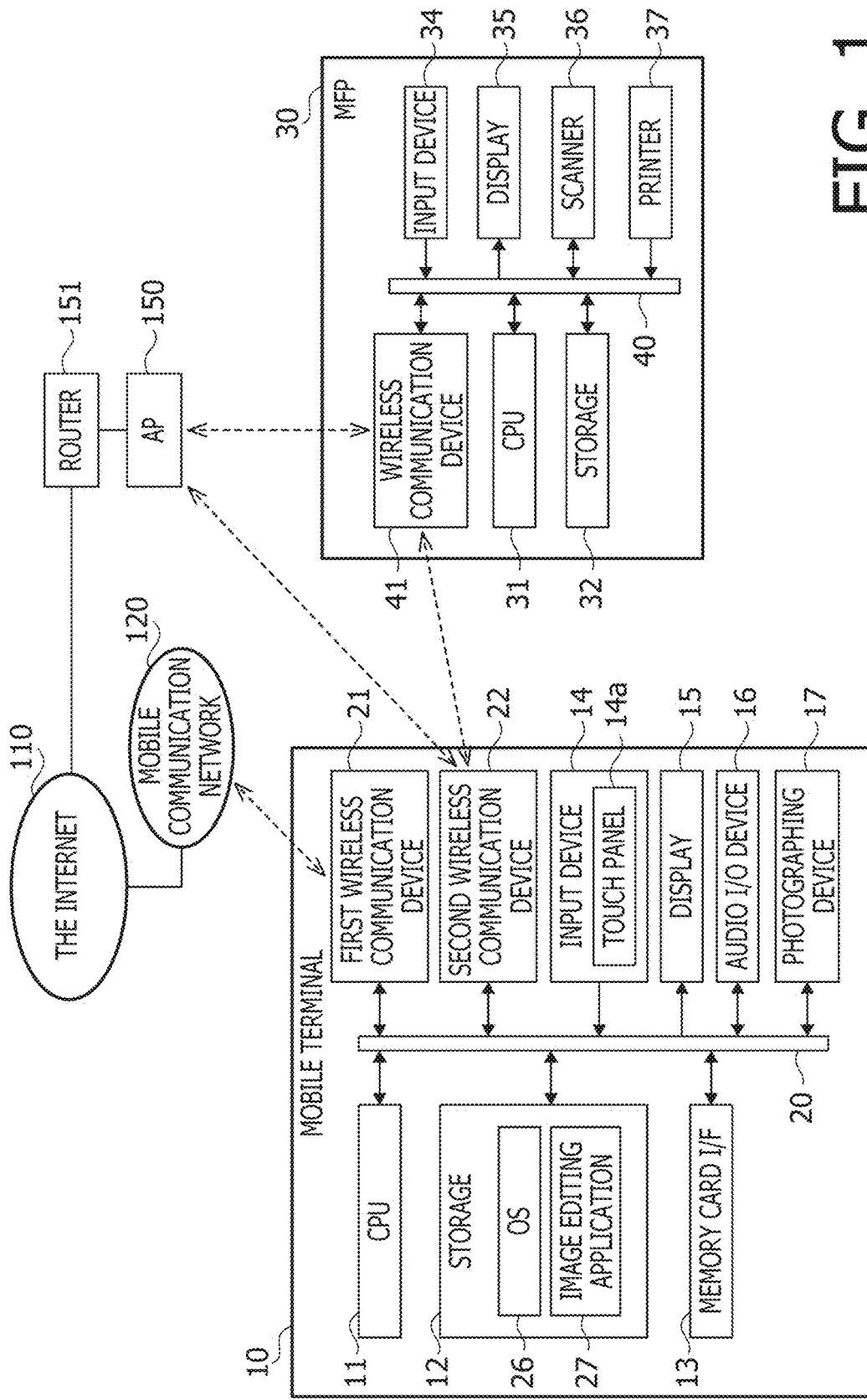
FIG. 1 is a block diagram schematically illustrating a configuration of an image processing system according to an illustrative embodiment of the disclosures.

FIG. 1 is a block diagram showing a configuration of an image processing system, which is an example of an information processing system, according to an illustrative embodiment of the disclosures. As shown in FIG. 1, the image processing system includes a mobile terminal 10 and an MFP (multi-function peripheral) 30.

The mobile terminal 10 is a portable information processing apparatus such as a smartphone or a tablet terminal which can be carried by a user and used in various places. The mobile terminal 10 has a CPU 11, a storage 12 a memory card I/F (interface) 13, an input device 14, a display 15, an audio I/O (input/output) device 16, a photographing device 17, a first wireless communication device 21 and second wireless communication device 22, which are interconnected through a bus line 20.

The CPU 11 is configured to execute programs stored in a non-transitory computer-readable medium to realize various functions. In the following description, the CPU 11 which is executing a program will occasionally be referred to as merely a name of the program. Accordingly, an expression "a program A does . . . " is intended to mean "the CPU 11 which executes a program A does . . . ". The same applies to describe operations of a CPU 31 of the MFP 30.

The storage 12 includes at least one semiconductor memory such as a ROM (read only memory), a RAM (random access memory), or a flash memory. It should be noted that a part of or all of functions, which are realized as the CPU 11 executes a program, may alternatively be realized by hardware configured by logical circuits, analog circuits and/or combinations thereof.

The memory card I/F 13 is an interface to which a non-volatile rewritable memory card is to be attached, and serves to control reading/writing of data from/in the memory card.

The input device 14 is configured to receive a user's input operation. The input device 14 has a touch panel 14a. Optionally, the input device 14 further includes an inputting device such as a plurality of operation buttons in addition to the touch panel 14a. The display 15 is a device configured to display images. For example, the display includes an LCD (liquid crystal display).

The storage 12 stores a plurality of kinds of software and a plurality of pieces of data. According to the illustrative embodiment, the storage 12 stores at least an OS (operating system) 26 and an image editing application 27. The OS 26 and the image editing application 27 have been installed in a computer system having the CPU 11.

It is noted that image data may be stored in the storage 12. For example, image data stored in a memory card may be retrieved therefrom through the memory card I/F 13 and stored in the storage 12. For another example, image data may be received from an external device through the first wireless communication device 21 or the second wireless communication device 22, and the received image data may be stored in the storage 12. Further, the mobile terminal 10 may be configured such that image data generated by the photographing device 17 may also be stored in the storage 12. It is noted that the mobile terminal 10 may be configured such that the image data corresponding to the image photographed by the photographing device 17 is stored in the memory card through the memory card I/F 13.

The touch panel 14a is overlaid on an image displaying area of the displaying device of the display 15. The touch panel 14a is an input device configured to detect an indicating operation by the user to indicate a particular position on the image displaying area with an indicator such as a finger or a pen. It is noted that the term "indicate" here means a condition where the indicator contacts the touch panel 14a, a condition where the indicator is located at a position very close to the touch panel 14a or both.

The touch panel 14a according to the illustrative embodiment is configured such that, when the indicating operation with the indicator is performed, the touch panel 14a outputs a detection signal indicating a position at which the indicating operation is performed. That is, when the touch panel 14a is configured to detect a contact of the indicator, the touch panel 14a outputs the detection signal indicating a position at which the touch panel 14a is touched by the indicator. When the touch panel 14a is configured to detect a closely located state of the indicator, the touch panel 14a outputs the detection signal indicating a position at which the touch panel 14a detects the indication panel closely located to the touch panel 14a.

Further, the touch panel 14a according to the illustrative embodiment, multiple indicating operations to indicate multiple positions using multiple indicators can be detected, respectively. The touch panel 14a is configured such that, when multiple indicating operations to respectively indicate multiple positions simultaneously, individual detection signals corresponding to respective ones of the indicated positions are output.

Further, the touch panel 14a according to the illustrative embodiment is configured such that, when an indicator touches the touch panel 14a, the touch panel 14a can detect a contacting strength of the indicator with categorizing the contacting strength into at least two levels.

Specifically, the touch panel 14a is configured to output the detection signal including a particular signal representing that the contacting strength of the indicator is equal to or greater than a particular threshold value when the indicator contacts the touch panel with its contacting strength being equal to or greater than the particular threshold value. Further, when the indicator contacts the touch panel with its contacting strength is less than the particular threshold value, the touch panel 14a may output the detection signal which does not include the above particular signal. Alternatively or optionally, in such a case, the touch panel may output the detection signal which includes another signal which is different from the above particular signal.

It is noted that the contact strength above may be defined by force (unit: [N]), pressure (unit: [Pa]) or physical quantity of other systems of units. It is noted that, in the following description, a term "indicating operation" means at least one of a condition where the indicator contacts the touch panel 14a at a contact strength which is less than a strength threshold value and another condition where the indicator is located very close to the touch panel 14a unless otherwise specifically noted. Further, in the following description, a condition where the indicator contacts the touch panel 14a at a contact strength which is greater than the strength threshold value will be referred to as a pressing operation.

The CPU 11 determines, based on the detection signals output by the touch panel 14a, whether indicating operations with use of the indicator has been executed, whether the pressing operation has been performed, whether the indicating operation has been performed, whether the pressing operation has been performed, and positions at which the indicating operation or the pressing operation has been performed.

The image editing application 27 receives indicator information representing the detection results above by the OS 26, and determines whether the indicating operations with the indicator has been performed, whether the pressure operation has been performed, and positions where the indicating operations or the pressure operations have been performed.

When the indicating operation is being performed, the CPU 11 receives information representing a moving condition of the indicating position and determines the movement of the indicator which is being operated for the indicating operation. It is noted that the information representing the moving condition of the indicating position represents at least one of a moving amount, a moving speed, a moving acceleration, and a moving direction.

The moving amount is received, for example, by operating changing amounts of coordinate positions indicated by the detection signals output by the touch panel 14a. The moving speed is received, for example, based on a time period to detect one coordinate position and to detect another coordinate position, and a distance between the two coordinate positions. The moving acceleration is received based on a changing amount of the moving speed. The moving direction is received, for example, by calculating changing directions of the coordinate positions represented by the detection signals output by the touch panel 14a. With the above information, the image editing application 27 can detect operations, as the operations with use of the indicator, a tapping operation, a dragging operation, a flicking operation, a swiping operation, a pinch-in operation, a pinch-out operation, and the like.

The audio I/O device 16 is a device having a microphone and a speaker through which audio signals are input/output. The photographing device 17 serves as a so-called digital camera, and is configured to photograph an image and generate image data representing the image. The image data photographed by the photographing device 17 is stored, for example, in the storage 12.

The first wireless communication device 21 is an interface used to execute an audio communication and a data communication through the mobile communication network 120. The first wireless communication device 21 may be configured, for example, to execute a wireless communication according to the LTE (long term evolution) standard.

The second wireless communication device 22 is an interface used to execute a communication with use of the wireless LAN standard (hereinafter, referred to as a wireless LAN). According to the illustrative embodiment, the wireless LAN communication the second wireless communication device 22 executes is a wireless LAN communication according to IEEE 802.1b/g/n.

The mobile terminal 10 is configured to execute the wireless LAN communication with an AP (access point) 150 through the second wireless communication device 22. The AP 150 is a relaying device configured to relay the wireless communication.

The AP 150 is connected to the Internet 110 through the router 151. Accordingly, the mobile terminal 10 can connect to the Internet 110 through the AP 150 and the router 151. It is noted that the mobile terminal 10 can also be connected to the Internet 110 through the first wireless communication device 21 and the mobile communication network 120.

The MFP 30 has functions of printing, scanning, copying and facsimile. The MFP 30 has a CPU 31, a storage 32, an input device 34, a display 35, a scanner 36, a printer 36 and a wireless communication device 41. These components are interconnected through a bus line 40.

The storage 32 stores programs for realizing each of the above functions. That is, the CPU 31 realizes each of the above functions by executing appropriate programs stored in the storage 32.

The wireless communication device 41 has the same configuration as the second wireless communication device 22 of the mobile terminal 10, and has the same function as the second wireless communication device 22. Accordingly, the mobile terminal 10 and the MFP 30 can make the wireless LAN communication with each other through the AP 150. It is noted that the mobile terminal 10 and the MFP 30 may be configured to directly execute the wireless LAN communication with each other without through the AP 150. Alternatively or optionally, the data communication between the mobile terminal 10 and the MFP 30 may be executed according to a communication method other than the wireless LAN.

The input device 34 is a device through which the input operations by the user is received. The input device 34 has a touch panel (not shown). The display 35 is a displaying device configured to display images. For example, the display 35 has an LCD.

The printer 37 is configured to print images on printing sheets. The scanner 36 is configured to read an image on an original sheet, and generate image data representing the read image. The image data generated by the scanner 36 can be printed with the printer 37 and/or wirelessly transmitted to the mobile terminal 10.

General Description on Function of Image Editing Application

The image editing application 27 installed in the mobile terminal 10 is application software having multiple functions including a function of applying various kinds of image processing to the image data. For example, the image editing application 27 has a print-related function of wirelessly transmitting the image data to the MFP 30 and causing the MFP 30 to print the image data. Further, the image editing application 37 has a scan-related function of wirelessly instructing the MFP 30 to read an original sheet, causing the MFP 30 to receive the image data representing the original sheet read by the MFP 30, and displaying the received image data on the display 15. Further, the image editing application 27 further includes a status confirming function of wirelessly receiving an operating condition of the MFP 30, remainder condition of consumables and the like from the MFP 30 and displaying the same.

The image editing application 27 further has an image editing function of applying various types of editing to the image subject to the above-explained functions. According to the illustrative embodiment, as editing methods applicable to the image, at least a crop editing, a rotation editing and a movement editing.

The crop editing is an editing method to extract a user-desired area within the image subject to edition (hereinafter, referred to as a target image) and generate image data representing the extracted image. The rotation editing is an editing method to rotate the target image so that, for example, a relative angle between the target image and the printing sheet when the target image is printed by the MFP 30 is adjusted. The movement editing is an editing method to move the target image so that, for example, a printing position on the printing sheet when the target image is printed by the MFP 30 is adjusted.

The image editing application 27, when started, displays a function selection screen on the display 15. The image editing application 27 operates, when displaying various kinds of screen, to send a command to the OS 26 to display a screen. Then, the OS 26 displays the target image on the display 15 in response to receipt of the command from the image editing application 27.

In the function selection screen, a selection menu enabling the user to select any one of multiple functions including the print-related function, the scan-related function, and the status confirmation function is displayed. The user can select the desired function to be executed from the selection menu.

When a function is selected through the function selection screen, the image editing application 27 changes the screen to one corresponding to the selected function. In the following description, as an example, it is assumed that the print-related function is selected.

When the print-related function is selected, the image editing application 27 displays an image selection screen enabling the user to select images to be printed. On the image selection screen, thumbnail images of the image data that mobile terminal 10 has are listed. It is noted that the image data displayed on the image selection screen may be part of the images represented by the image data stored in the storage 12 or all of the images represented by the image data. Optionally or alternatively, the image data displayed on the image selection screen may be part of the images represented by the image data stored in the memory card attached to the memory card I/F 13 or all of the images represented by the image data stored in the memory card which is attached to the memory card I/F 13.

When one or more of the images are selected through the image selection screen, the image editing application 27 displays a print preview screen showing preview image(s) corresponding to the selected image(s). The print preview images show print results when the selected image would be printed by the MFP 30.

Further, on the print preview screen, an edit button to edit the selected image, a print button to wirelessly transmit the image data of the selected image to the MFP 30 for printing, and a setting button to make various setting when the printing is executed by the MFP 30 are also displayed. When the edit button is tapped on the print preview screen, an edit method selection screen 50 as shown in FIG. 2 are displayed.

Figure 2:
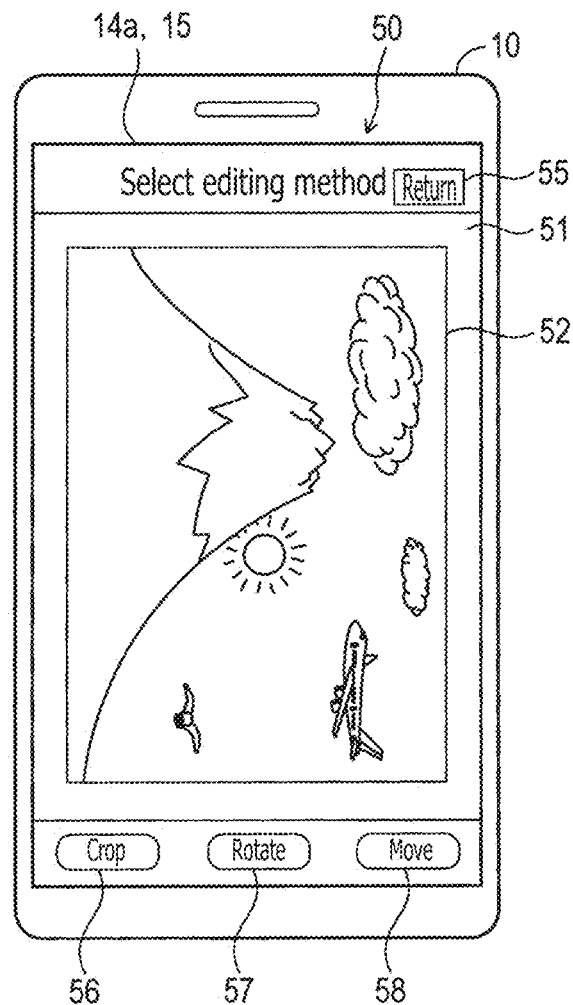
FIG. 2 is an editing method selection screen displayed on a display of a mobile terminal of the image processing system shown in FIG. 1.

As shown in FIG. 2, on the edit method selection screen 50, a edit target display area 51 is defined, and an edit target image 52 subjected to be edited is displayed within the edit target area 52. Further, on the edit method selection screen 50, a return button 55 is displayed. When the return button 55 is tapped, the image editing application 27 re-display the print preview screen.

Figure 5:
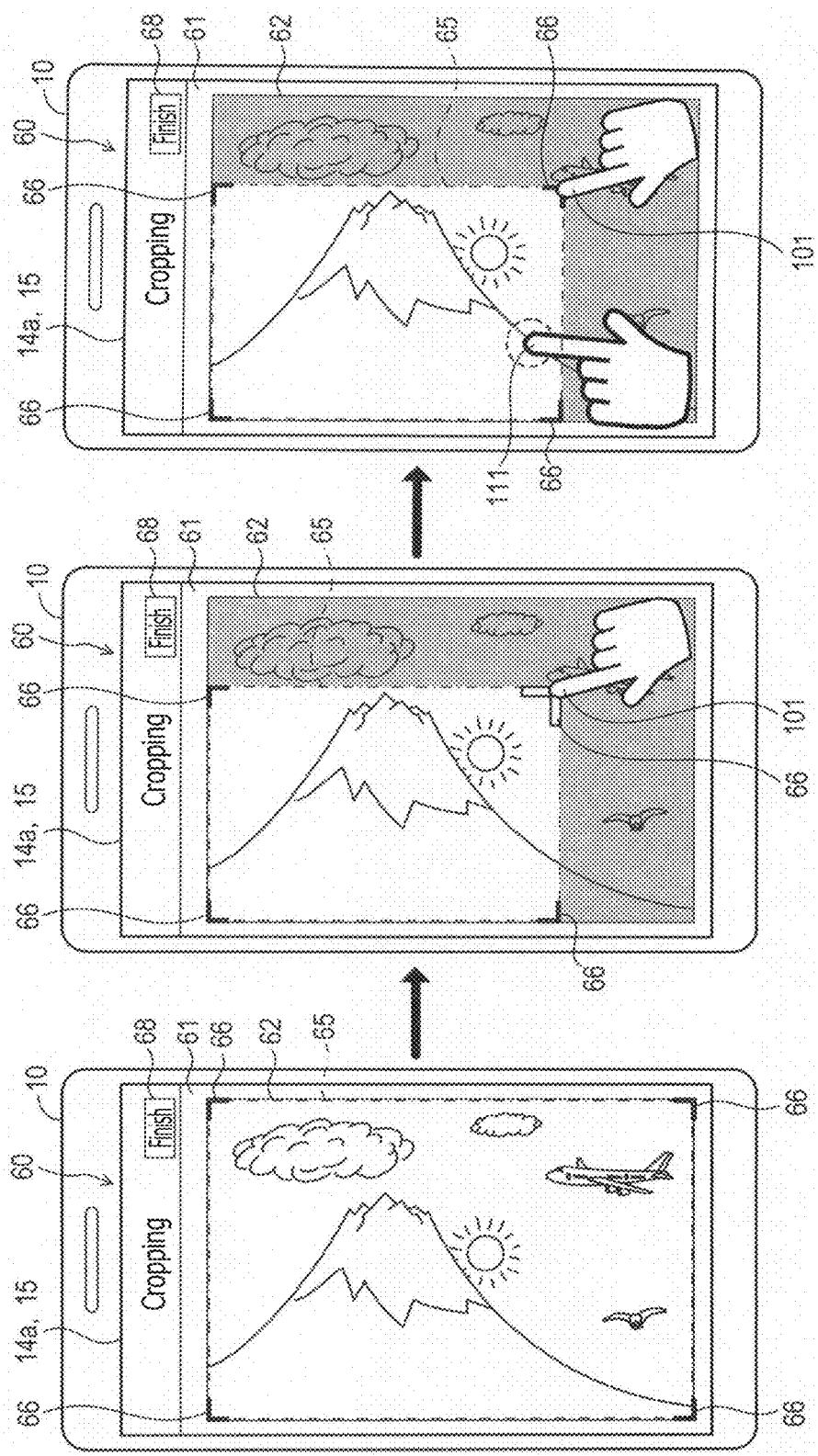
FIGS. 5A, 5B and 5C show cropping of an image according to the illustrative embodiment.
Figure 9:
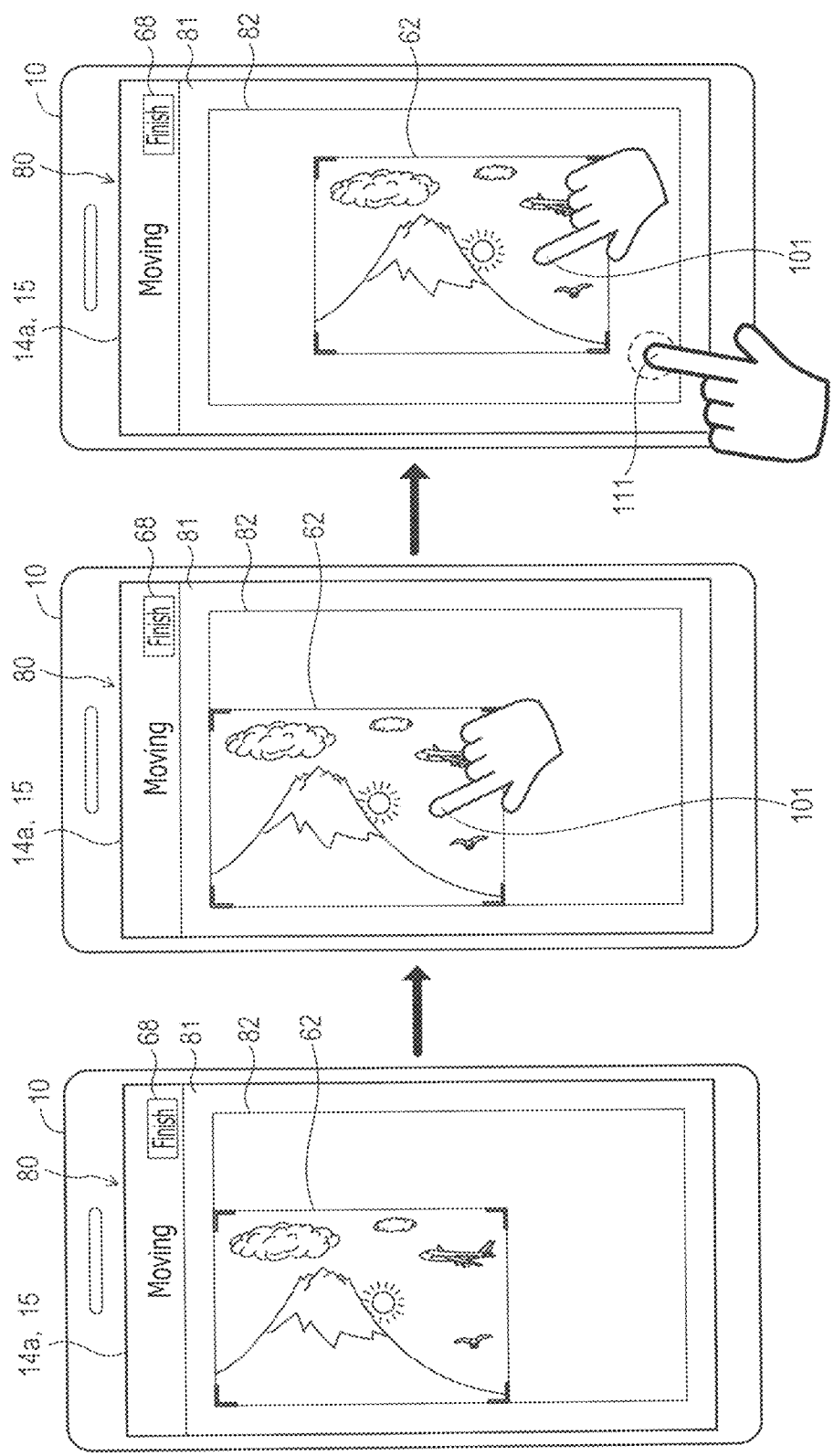
FIGS. 9A, 9B and 9C show moving of an image according to the illustrative embodiment.

On the edit method selection screen 50, a crop button 50, a rotate button 57 and a move button 58 are displayed. When the crop button 50 is tapped, the image editing application 27 displays a crop editing screen 60 (see FIG. 5) on which a crop edition can be applied to the edit target image 52. When the rotate button 57 is tapped, the image editing application 27 displays a rotation editing screen 70 (see FIG. 7) on which a rotation edition can be applied to the edit target image 52. When the move button 58 is tapped, the image editing application 27 displays a movement editing screen 80 (see FIG. 9) on which the movement editing can be applied to the edit target image 52.

By tapping one of the crop button 56, the rotate button 57 and the move button 58 on the edit method selection screen 50, the user can edit the edit target image 52 in accordance with the edit method corresponding to the tapped button. It is noted that the edit method selection screen 50 shown in FIG. 2 as a selection screen enabling the user to select the edit method is only an example, and a selection screen having different contents may be displayed, and the user may select the edit method through such a selection screen.

Image Editing Process

Figure 3:
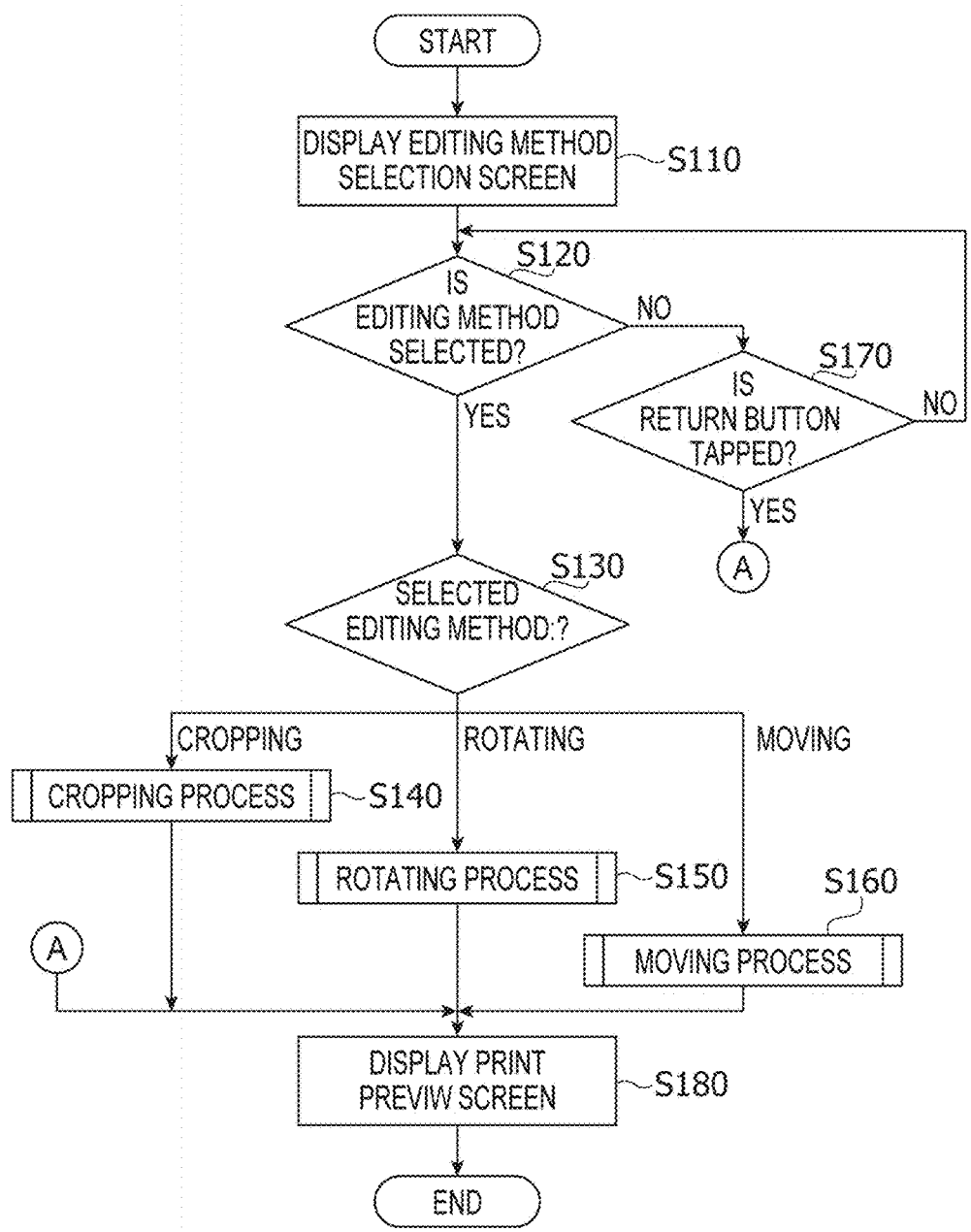
FIG. 3 is a flowchart illustrating an image editing process according to the illustrative embodiment.

Among processes the image editing application 27 can execute, an image editing process will be described, referring to FIG. 3. When the edit button is tapped in the print preview screen, the image editing application 27 executes the image editing process as shown in FIG. 3. As mentioned above, the CPU 11 executes a program to realize the image editing process. However, for the brevity, it is described that the image editing application 27 executes respective steps of the image editing process.

When the image editing process shown in FIG. 3 is started, the image editing application 27 displays the edit method selection screen 50 (see FIG. 2) (S110). In S120, the image editing application 27 determines whether one of the editing methods is selected (i.e., whether one of the crop button 56, the rotate button 57 and the move button 58 is tapped) based on the indicator information supplied from the OS 26. When no editing method is selected, that is, when none of the above three buttons 56-58 is tapped, the image editing application 27 proceeds to S170.

In S170, the image editing application 27 determines whether the return button 55 is tapped based on the indicator information supplied by the OS 26. When the return button 55 has not been tapped (S170: NO), the image editing application 27 returns to S120. When the return button 55 has been tapped (S170: YES), the image editing application 27 displays the print preview screen in S180. That is, the image editing application 27 displays a screen which was previously displayed before the edit method selection screen 50 is displayed.

When it is determined in S120 that one of the three buttons 56, 57 and 58 is tapped, and one of the editing methods is selected, the image editing application 27 determines which one of the editing methods is selected (S130). This determination may be executed, based on the indicator information supplied by the OS 26, and based on which one of display positions of the buttons corresponds to the tapped position. When the selected editing method is the crop editing, the image editing application 27 executes the cropping process in S140. When the selected editing method is the rotation editing method, the image editing application 27 executes the rotating process in S150. When the selected method is the movement method, the image editing application 27 executes the moving process in S160.

Figure 4:
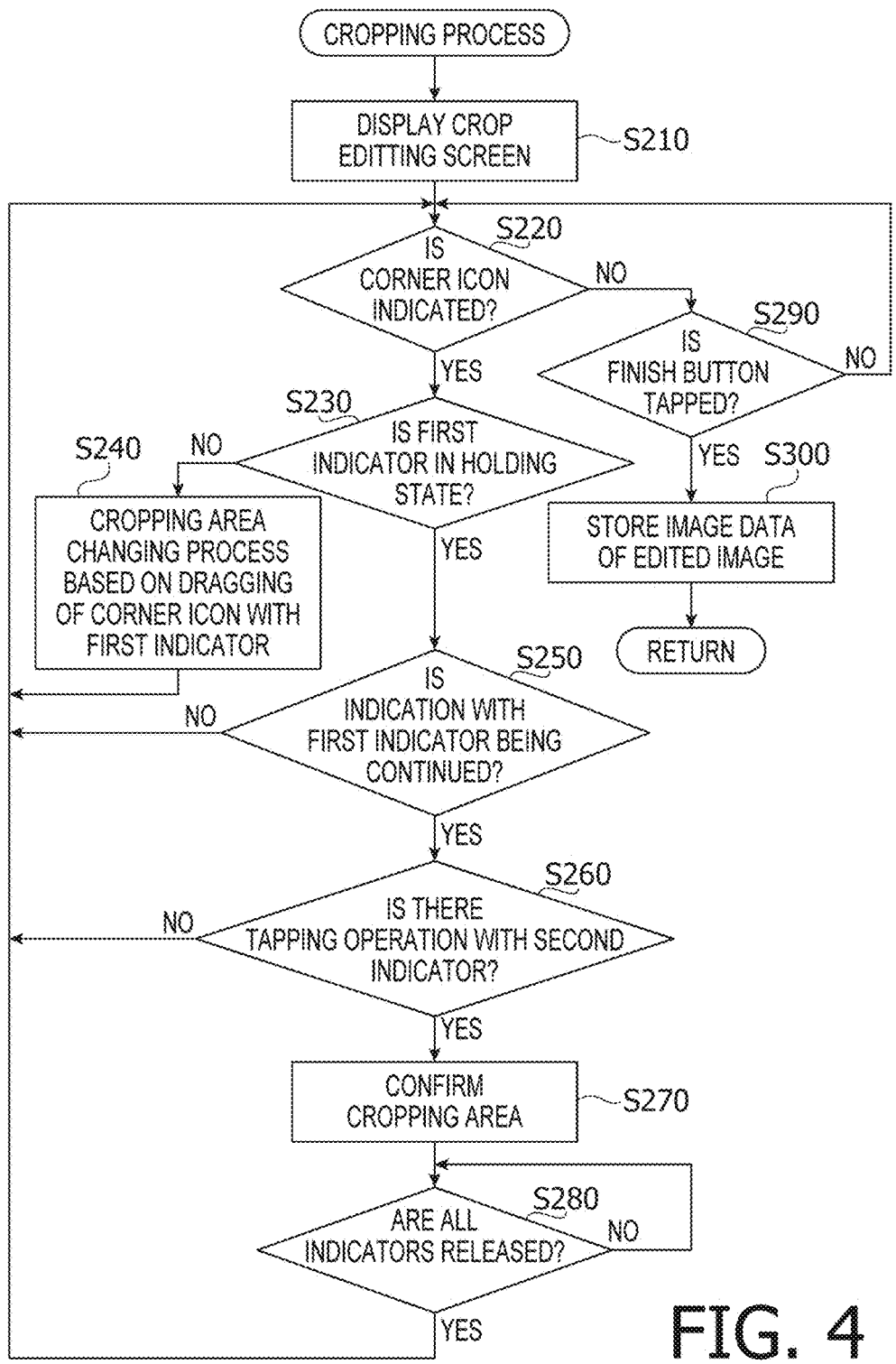
FIG. 4 is a flowchart illustrating a cropping process which is called in the image editing process shown in FIG. 3.

Firstly, the cropping process (S140) will be described with reference to FIG. 4. When the image editing application 27 proceeds to the cropping process, in S210, a crop editing screen 60 is displayed. The crop editing screen 60 has an editing area 61 as shown in FIG. 5A, and an edit target image is displayed within the editing area 61. Further, a finish button 68 to finish the edition is also displayed in the crop editing screen 60.

Immediately after the displayed screen is changed to the crop editing screen 60, a frame line 65 surrounding an entire edit target image 62 is overlaid on the edit target image 62. Further, at four corners of the frame line 65, corner icons 66 are displayed in an overlaid manner, respectively.

The frame line 65 serves to indicate a particular area to be extracted from the original edit target image 62. According to the illustrative embodiment, the particular area will be referred to as a cropping area. The area surrounded by the frame line 65, or the cropping area can be adjusted by indicating one of the four corner icons 66 with use of the indicator, and moving the indicator. It is noted that, in the cropping process shown in FIG. 4, the indicator to be operated to indicate the corner icons 66 for crop edition will be referred to as a first indicator.

The corner icons 66 have the same size as shown in FIG. 5A when the indicating operation with the indicator is not being performed. When one of the corner icons 66 is indicated with the first indicator 101 as shown in FIG. 5B, the size of the indicated corner icon 66 becomes larger. The corner icon 66 displayed in a larger size than the others as indicated with the first indicator 101 follows movement of the first indicator 101 to move. That is, the larger corner icon 66 can be dragged with the first indicator 101.

By dragging the corner icon 66 with the first indicator 101, positions of the frame line 65 changes in accordance with a changed position of the corner icon 66. That is, depending on the positions of the corner icons 66, the cropping area, which is the area surrounded by the frame line 65, changes. Any of the four corner icons 66 can be dragged. Accordingly, the user can freely adjust the cropping area by dragging desired corner icons 66.

It is noted that the adjusting method of the cropping area need not be limited to the above-described method of moving the four corner icons 66. As another method, for example, the cropping area may be changed by dragging any one of four sides constituting the frame line 65. Optionally, an icon may be displayed at a substantially central position of each of the four sides constituting the frame line 65, and each side may be moved by dragging the icon displayed at the central portion of each side.

In S220, the image editing application 27 determines whether one of the corner icons 66 is operated with the indicator based on the indicator information supplied by the OS 26. When none of the corner icons 66 is being indicated, the image editing application 27 determines, in S290, whether the finish button 68 is tapped based on the indicator information supplied by the OS 26. When the finish button 68 is not tapped, the image editing application 27 returns to S220.

When it is determined that the finish button 68 is tapped, the image editing application 27 generates image data representing the image within the cropping area surrounded by the frame line 65, besides the image data of the original edit target image 62, and stores the same in the storage 12. Thus, it becomes possible to handle the image to which the crop edition has been applied independently, besides the original edit target image 62. Accordingly, for example, the image to which the crop edition has been applied can be wirelessly transmitted to the MFP 30 and the MFP 30 may be caused to print the image.

After execution of S300, the image editing application 27 proceeds to S180 of FIG. 3. At this stage, the image displayed on the preview screen is the image to which the crop editing is applied, that is, the image generated in the previously processed on the crop editing screen 60, which is the image represented by the image data stored in S300.

When one of the corner icons 66 is indicated (S220: YES), the image editing application 27 proceeds to S230. In S230, the image editing application 27 determines whether the first indicator 101, which is indicating the corner icon 66, is in the holding state based on the indicator information supplied by the OS 26. It is noted that the holding state is a state where the indicator, which is being operated to indicate a position on the touch panel 14a, is unmoved with its indicating status being maintained. It is noted that, even if the indicator is not completely unmoved but moved slightly, the image editing application 27 may determine that the indicator is in the holding state if the moving speed is equal to or less than a particular judgment speed. It is also noted that the judgment speed may be arbitrarily determined.

When it is determined that the first indicator is not in the holding state (S230: NO), the image editing application 27 proceeds to S240. In S240, the image editing application 27 changes the crop area based on dragging of the corner icon 66 with the first indicator. After execution of S240, the image editing application 27 returns to S220.

When it is determined that the first indicator is in the holding state (S230: YES), the image editing application 27 proceeds to S250. In S250, the image editing application 27 determines whether the indication of the corner icon 66 with use of the first indicator 101 is maintained based on the indicator information supplied by the OS 26. When the indication of the corner icon 66 with the first indicator 101 is not maintained (S250: NO), the image editing application 27 returns to S220. For example, when the first indicator 101 is released from the touch panel 14a and the indication of the corner icon 66 is terminated, the image editing application 27 returns to S220 from S260.

When it is determined that the indication of the corner icon 66 with the first indicator 101 is maintained (S250: YES), the image editing application 27 proceeds to S260. In S260, the image editing application 27 determines whether another position, which is different from the position indicated with use of the first indicator 101, with a second indicator 111 (which is different from the first indicator 101) based on the indicator information supplied by the OS 26. When it is determined that tapping by the second indicator 111 is not being performed (S260: NO), the image editing application 27 returns to S220. When it is determined that tapping with the second indicator 111 has been performed (S260: YES), the image editing application 27 confirms that the area currently surrounded by the frame line 65 is the cropping area in S270.

That is, as shown in FIG. 5C, when another position, which is different from the position indicated with use of the first indicator 101, is tapped with a second indicator 111 with the first indicator 101 being in the holding state, the area currently surrounded by the frame line 65 is confirmed as the cropping area. It is noted that the term "confirmed" here means the cropping area has been decided and is maintained even if the first indicator 101, which is contacting the touch panel 14*a*, moves. After the cropping area is confirmed by tapping with the second indicator 111 even if the first indicator 101 moves, the corner icon 66 will not be dragged and the cropping area will not be changed until all the indicators are released from the touch panel 14*a*. If the first indicator 101 is once released from the touch panel 14*a* so that no indicator is touching the touch panel 14*a*, it becomes possible to change the cropping area again.

In S280, the image editing application 27 determines whether the all the indicators have been released from the touch panel 14*a* based on the indicator information supplied from the OS 26. When indication of the indicator is maintained, determination in S280 is repeated. When it is determined that all the indicators have been released from the touch panel 14*a* and no operation is applied to the touch panel 14*a* (S280: YES), the image editing application 27 returns to S220.

Thus, after the cropping area is determined by tapping with the second indicator 111, by releasing all the indicators from the touch panel 14*a*, it becomes possible to change the cropping area again. If it is not necessary to change the cropping area any more, by tapping the finish button 68, the image data representing the image within the currently determined cropping area can be newly generated.

Figure 6:
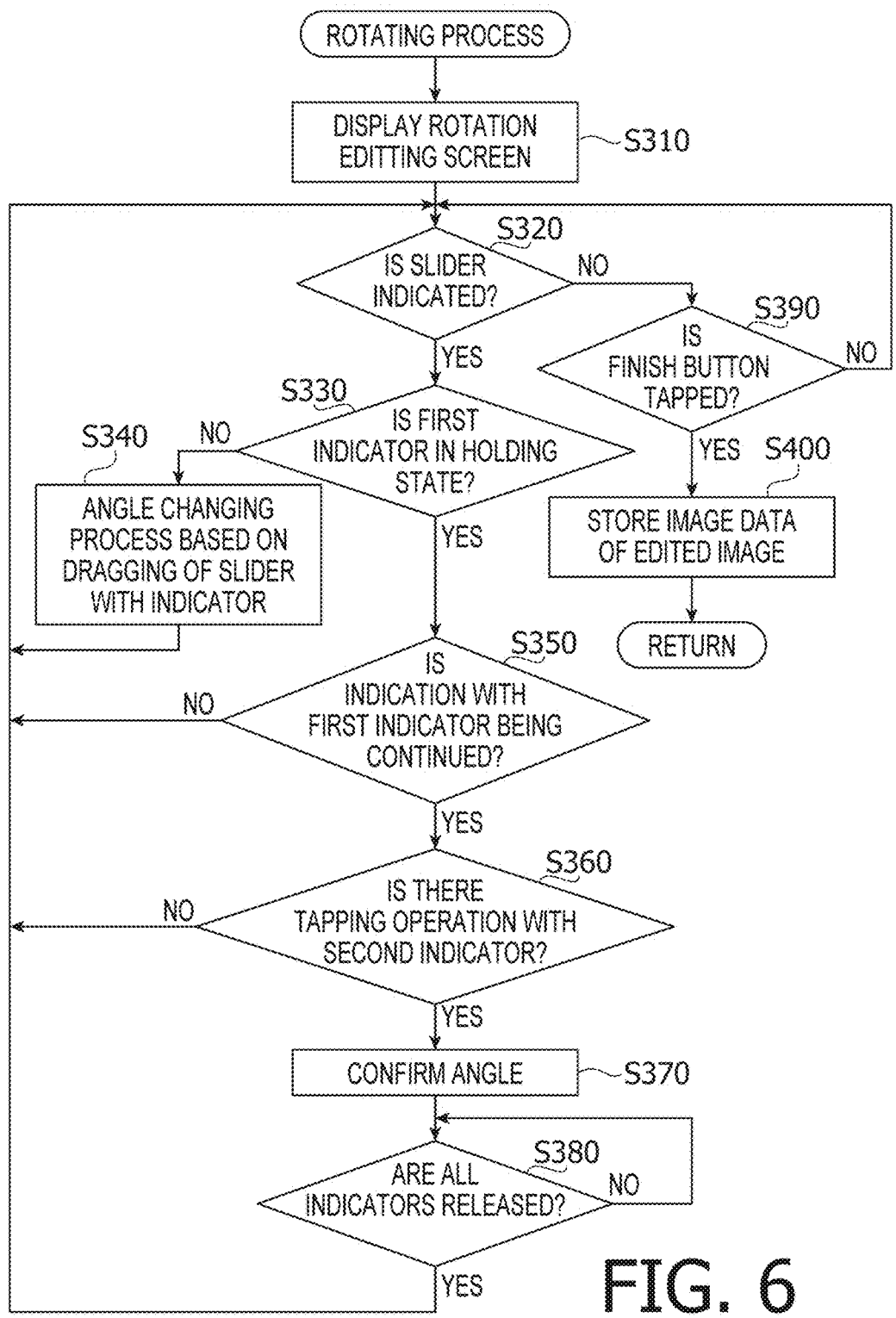
FIG. 6 is a flowchart illustrating a rotating process which is called in the image editing process shown in FIG. 3.
Figure 7A:
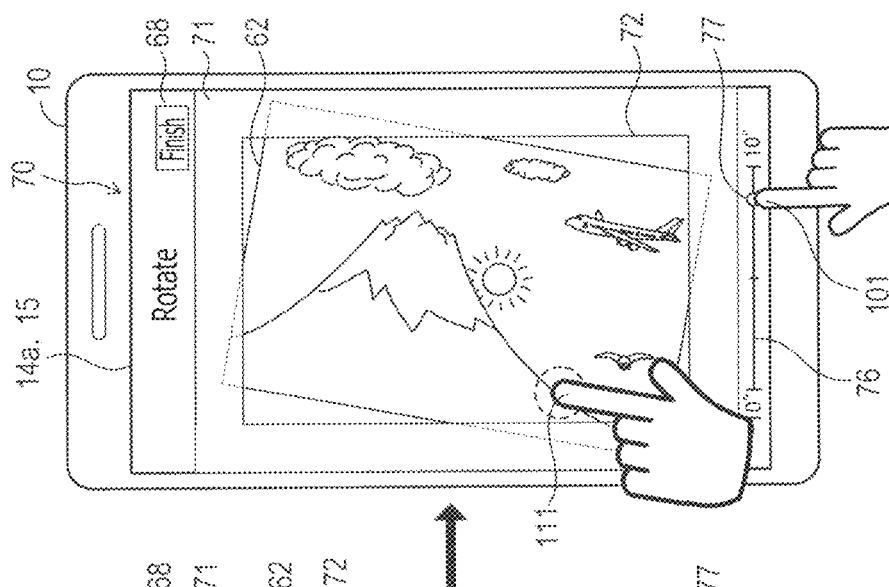
FIGS. 7A, 7B and 7C show rotation of an image according to the illustrative embodiment.

Next, the rotating process (S150 of FIG. 3) will be described with reference to FIG. 6. As shown in FIG. 6, when the rotating process is executed, the image editing application 27 displays a rotation edit screen 70 (S310). The rotation edit screen 70 includes an editing area 71 as shown in FIG. 7A, and within the editing area 71, the edit target image 62 is displayed. Further, the finish button 68 is also displayed within the rotation edit screen 70.

Figure 7B:
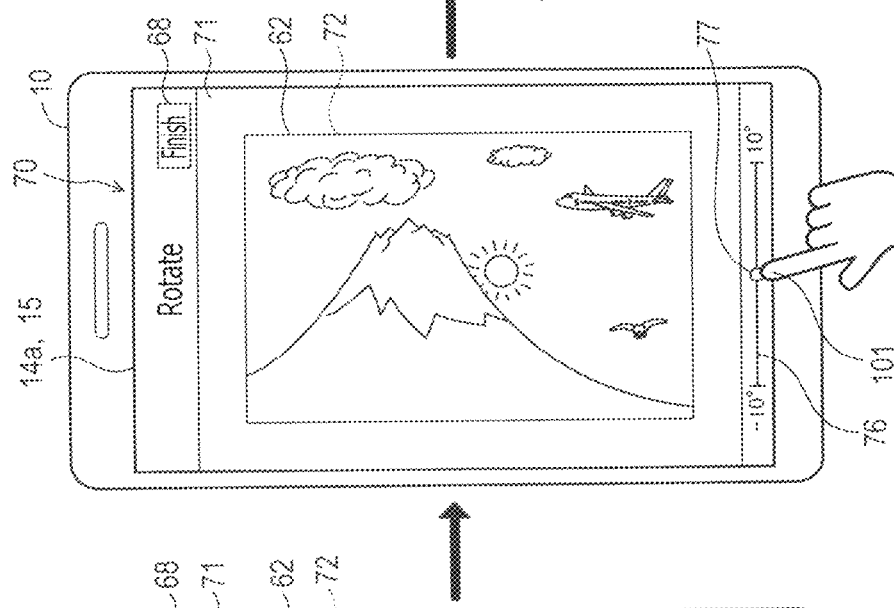
Figure 7C:
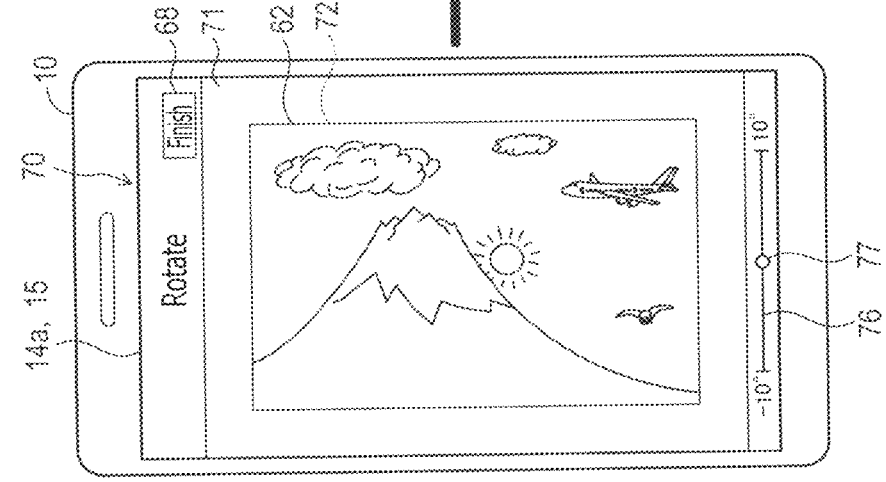

Further, within the editing area 71, a printing sheet frame 72 is displayed as shown in FIGS. 7A-7C. The printing sheet frame 72 represents the size of the printing sheet when the edit target image 62 is to be printed by the MFP 30. That is, when the edit target image is printed by the MFP 30, the image within the printing sheet frame 72 is printed on the printing sheet. It is noted that relative size, position, angle and the like of the image with respect to the printing sheet frame 72 are reflected when the image is printed on the printing sheet.

Further, on the rotation edit screen 70, a slider 76 used to adjust the angle of the edit target image 62 is displayed. By dragging a knob 77 of the slider 76 with the indicator, the edit target image 62 can be rotated, and the rotation angle thereof can be adjusted. It is noted that the "angle" here means a relative angle between the rotated image and the original image (i.e., the image before edited). In the following description, the angle of the original image will be referred to as a reference angle (0 degree). According to the illustrative embodiment, for example, the adjustable angle is within a range of −10 degrees to +10 degrees with respect the original image (i.e., with respect to the reference angle of 0 degree). The adjusted angle is reflected to the printing result.

In the rotating process shown in FIG. 6, the indicator operated to move the knob 77 of the slider 76 will be referred to as the first indicator. A position at which the slider 76 is displayed need not be limited to the position as shown in FIGS. 7A-7C. For example, the slider 76 may be displayed within the editing area 71. In such a case, a part of or whole of the slider 76 may be overlaid on the edit target image 62.

Further, the angle adjustment method need not be limited to the method of operating the slider 76. For example, the user may be encouraged to operate two indicators at the same time such that the two indicators are relatively rotated on the touch panel 14*a*, thereby rotating the edit target image 62.

In S320, the image editing application 27 determines whether the knob 77 of the slider 76 is operated with the first indicator 101 based on the indicator information supplied by the OS 26. FIG. 7B shows a case where knob 77 is being operated with the first indicator 101. When the knob 77 is not being operated (S330: NO), the image editing application 27 determines whether the finish button 68 is tapped based on the indicator information supplied by the OS 26 (S390). When the finish button 68 has not been tapped (S390: NO), the image editing application 27 returns to S320.

When it is determined that the finish button 68 has been tapped (S390: YES), the image editing application 27 generates image data representing the image at the currently set angle, separately from the image data of the original edit target image 62, and stores the same in the storage 12. With this configuration, the image editing application 27 handle the image to which the rotation editing is applied, independently of the original edit target image 62, and for example, wirelessly transmits the same to the MFP 30 so as to be printed.

After execution of S400, the image editing application 27 proceeds to S180 (FIG. 3) and displays the print preview screen. At this stage, the image displayed on the print preview screen is the image represented by the image data stored at S400, that is the image to which the rotation editing is applied by the rotation edit screen 70.

When the knob 77 is being operated with the first indicator 101, the image editing application 27 proceeds to S330. In S330, the image editing application 27 determines whether the first indicator 101, which is being used to operate the knob 77, is in the holding state based on the indicator information supplied by the OS 26.

When it is determined that the first indicator 101 is not in the holding state (S330: NO), the image editing application 27 proceeds to S340. In S340, the image editing application 27 changes the angle of the edit target image 62 based on a dragged amount of the knob 77. After execution of S340, the image editing application 27 returns to S320.

When it is determined that the first indicator 101 is in the holding state (S330: YES), the image editing application 27 proceeds to S350. In S350, the image editing application 27 determines whether the operation of the knob 77 with the first indicator 101 is continued based on the indicator information supplied by the OS 26. When it is determined that the operation of the knob 77 with the first indicator 101 has not been continued (S330: NO), the image editing application 27 returns to S320. When it is determined that the operation of the knob 77 with the first indicator 101 has been continued (S330: YES), the image editing application 27 proceeds to S360.

In S360, the image editing application 27 determines whether a position different from the position at which the first indicator 101 operates is tapped by a second indicator, which is different from the first indicator 101, based on the indicator information supplied by the OS 26. When it is determined that tapping with the second indicator 111 is not performed (S360: NO), the image editing application 27 returns to S320. When it is determined that tapping with the second indicator 111 has been performed, the image editing application 27 determines the currently set angle of the edit target image 62 as the determined angle of the edit target image 62 in S370.

FIG. 7C shows a case where the edit target image 62 is rotated by approximately eight degrees with respect to the original image. In the condition shown in FIG. 7C, if the user taps a position, which is different from the operation position with the first indicator 101, with the second indicator 111, with keeping the first indicator in the holding state, the current angle of the edit target image 62 is confirmed to be the set angle. After the angle is confirmed by tapping with the second indicator 111, unless all the indicators are released from the touch panel 14a, even if the first indicator 101 is moved, the knob 77 of the slider 76 will not be dragged, and the angle of the image will not be changed.

In S380, the image editing application 27 determines whether all the operated indicators has been released from the touch panel 14a based on the indicator information supplied by the OS 26. When an operation of at least one indicator has been continued (S280: NO), S280 is repeated. When all the indicators have been released from the touch panel 14a (S280: YES), and no operation is being made to the touch panel 14a, the image editing application 27 returns to S320.

Accordingly, after the angle has been confirmed by tapping with the second indicator 111, by releasing all the indicators from the touch panel 14a, it becomes possible to change the angle again. If it is not necessary to change the angle again, by tapping the finish button 68, the image data representing the rotated image, of which rotation angle being the determined angle at this stage, can be generated.

Figure 8:
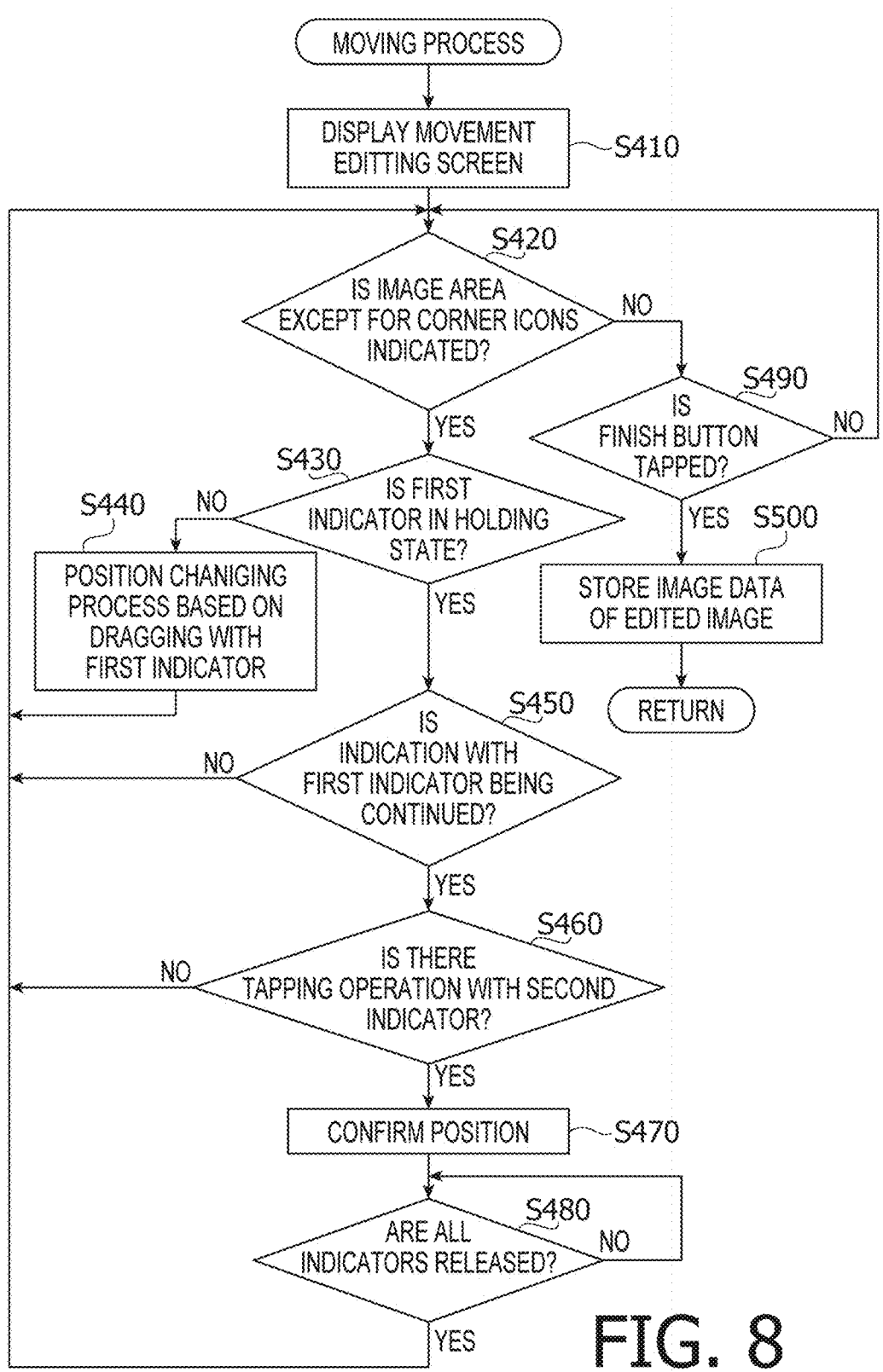
FIG. 8 is a flowchart illustrating a moving process which is called in the image editing process shown in FIG. 3.

Next, the moving process (S160 of FIG. 3) will be described with reference to FIG. 8. As shown in FIG. 8, when the moving process is started, the image editing application 27 displays a movement edit screen 80 (S410). The movement edit screen 80 has, as shown in FIG. 9A, an editing area 81, and a print area frame 82 is included in the editing area 81. The print area frame 82 indicates an area of the printing sheet within which an image can be printed by the MFP 30. It is noted that, the edit target image 62 is displayed within the print area frame 82.

At four corners of the edit target image 62, corner icons are displayed, respectively. The corner icons do nothing with the movement editing according to the illustrative embodiment, but may be modified such that the corner icons are used for the movement editing. For example, corner icons may be used to scaling the edit target image 62 by dragging the corner icons. It is noted that, in the moving process shown in FIG. 8, the indicator operated with respect to the edit target image 62 for movement editing will be referred to as a first indicator 101.

In S420, the image editing application 27 determines whether the image area of the edit target image 62 excluding the corner icons has been indicated with the first indicator 101 based on the indicator information provided by the OS 26. FIG. 9B shows a condition where the image area of the edit target image 62 is being indicated with the first indicator 101. When the image area is not indicated (S420: NO), the image editing application 27 proceeds to S490 where the image editing application 27 determines whether the finish button 68 has been tapped based on the indicator information supplied by the OS 26. When the finish button 68 has not been tapped (S490: NO), the image editing application 27 returns to S420.

When the finish button 68 has been tapped (S490: YES), the image editing application 27 generates image data of the edit target image 62 to which information representing currently displayed condition (i.e., the position and size within the print area frame 82 is associated), and store the same in the storage 12 (S500), besides the image data of the original edit target image 62. By storing the image data in S500, the image editing application 27 is capable of handling the image subjected to the movement editing independently. Thus, for example, the image editing application 27 can wirelessly transmit such image data to the MFP 30 for printing.

After execution of S500, the image editing application 27 moves to S180 of FIG. 3 and displays the print preview screen. At this stage, the image displayed on the print preview screen is the image subjected to the movement editing, that is, the image generated in the previously displayed movement edition screen 80 (i.e., the image represented by the image data which was stored in S500).

When the image area excluding the corner icons of the edit target image 62 has been indicated (S420: YES), the image editing application 27 proceeds to S430. In S430, the image editing application 27 determines whether the first indicator 101 which indicates the image area is in the holding state based on the indicator information supplied by the OS 26.

When it is determined that the first indicator 101 is not in the holding state (S430: NO), the image editing application 27 proceeds to S440. In S440, the image editing application 27 changes the position of the edit target image 62 based on dragging of the image with the first indicator. After execution of S440, the image editing application 27 returns to S420.

When it is determined that the first indicator 101 is in the holding state (S430: YES), the image editing application 27 proceeds to S450. In S450, the image editing application 27 determines whether the operation of the image area with the first indicator 101 has been continued based on the indicator information supplied by the OS 26. When the indication of the image area with the first indicator 101 has not been continued (S450: NO), the image editing application 27 returns to S420.

When it is determined that the indication of the image area with the first indicator 101 has been continued (S450: YES), the image editing application 27 proceeds to S460. In S460, the image editing application 27 determines whether another position, which is different from the position being indicated with the first indicator, has been tapped with a second indicator 111 based on the indicator information supplied by the OS 26. When it is determined that tapping with the second indicator has been performed (S460: YES), the image editing application 27 confirms the position of the edit target image 62 at this point of time in S470.

As shown in FIG. 9C, by tapping a position, which is different from the operating position of the first indicator 101, with the second indicator 111 with maintaining the first indicator 101 being in the holding state, the current position of the edit target image 62 within the print area frame 82 is confirmed to be fixed. After the position is confirmed as tapping with the second indicator 111 has been performed, even if the first indicator 101 moves, the edit target image 62 will not be dragged anymore and the position will not be changed until all the indicators are released from the touch panel 14a.

In S480, the image editing application 27 determines whether all the operated indicators have been released from the touch panel 14a based on the indicator information supplied by the OS 26. This determination can be made, for example, based on absence/presence of the detection signals from the touch panel 14a. That is, when the touch panel 14a does not output the detection signal, it is determined that the all the indicators have been released from the touch panel 14a. It is noted that absence/presence of the detection signal from the touch panel 14a may be received from the OS 26. Alternatively, the image editing application 27 may be configured to recognize absence/presence of the detection signal from the touch panel 14a not through the OS 26.

When the indication through the indicator has been continued (S480: YES), the image editing application 27 repeats S480. When all the indicators have been released from the touch panel 14a and no indication of a position is made with respect to the touch panel 14a (S480: NO), the image editing application 27 returns to S420.

Thus, by releasing all the indicators from the touch panel 14a after position of the edit target image 62 is confirmed by tapping of the second indicator, it becomes possible to change the position of the edit target image 62 again. If it is unnecessary to change the position again, by tapping the finish button 68, it becomes possible to newly generate the image data representing a state where the edit target image 62 is arranged at the currently determined position.

As described above, according to the illustrative embodiment, after editing of an image with use of the first indicator is performed, with maintaining the first indicator in the holding state, the edited contents can be fixed. That is, according to the illustrative embodiment, with keeping the first indicator, with which editing of an image is performed, in the holding state, by tapping another position with the second indicator, the edited contents can be confirmed.

After the edited contents are confirmed, re-editing cannot be done until all the indicators are released. Therefore, after confirmation, another indicator moves in a direction of the plane of the touch panel 14a when the first indicator 101 is released, the edited contents are not changed. Accordingly, with the above configuration, the user-desired edit results can be realized easily and effectively, with suppressing lowering of user operability.

According to the illustrative embodiment, when the edited contents are confirmed, it is necessary to bring the first indicator into the holding condition. According to the illustrative embodiment, by tapping the touch panel 14a with the second indicator with the first indicator 101 being in the holding state, the edited contents are confirmed. Accordingly, the user can receive the desired edited results with high accuracy.

According to the illustrative embodiment, as a particular contact method with the second indicator, which triggers confirmation of the edited results, a tapping operation with the second indicator is employed. This particular contact method is only an example, and another operation and/or contacting method may be alternatively or optionally employed. For example, the particular contact method is merely a contact or a close location of the second indicator with respect to the touch panel 14a. For another example, the particular contact method is a pressing operation of the second indicator with respect to the touch panel 14a. In this case, when the pressing operation with the second indicator is performed, the edited contents are confirmed. By configuring that the edited contents are confirmed by the pressing operation with the second indicator, confirmation of the edited contents can be made based on apparent intension of the user to confirm the edited contents.

Further, according to the illustrative embodiment, after the edited contents have been confirmed with use of the second indicator, by releasing all the indicators, editing can be performed again. When all the indicators are released, according to the illustrative embodiment, editing is started with the previously confirmed edited contents being used as the starting point. As above, since the re-editing becomes available by releasing all the indicators even after the edited contents have been confirmed, user-desired editing of the image can be performed efficiently.

According to the illustrative embodiment, three kinds of editing processes (i.e., cropping, rotating and moving) can be applied, the user-desired image can be received efficiently.

Other Embodiments

It is noted that the present disclosures need not be limited to the configuration of the above-described illustrative embodiment, but can be modified in various ways.

In the illustrative embodiment, the three kinds of editing processes (i.e., cropping, rotating and moving) are employed as the editing methods. The above is only an example, and the number and the type of the editing methods may be modified in various ways.

As another editing method, other than the above-described three methods, for example, a scaling method to magnify/reduce images may be employed. As operation methods to magnify or reduce the images, as shown in FIG. 9A, a method using corner icons displayed at four corners of the image may be employed. The user may scale the image by dragging the corner icons. Another operation is a so-called pinch-in/pinch-out operation in which multiple (e.g., two) indicators are simultaneously used to indicate multiple portions on the touch panel and at least one of the indicators is moved with respect to the others.

Figure 10:
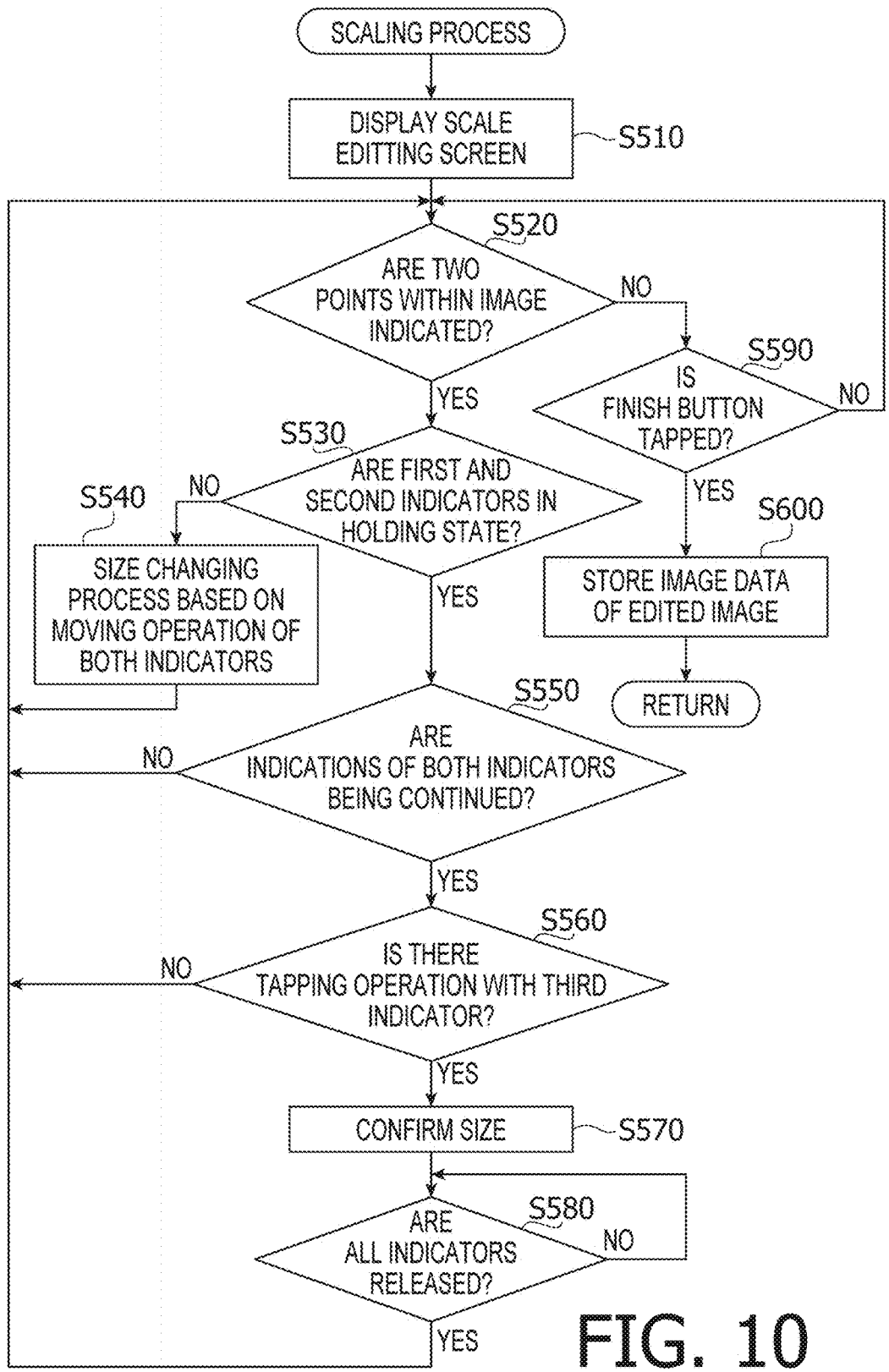
FIG. 10 is a flowchart illustrating a scaling process according to the illustrative embodiment.

Hereinafter, the scaling process in which an image is magnified/reduced by pinch-out/pinch-in operations will be described with reference to FIG. 10. It is noted that the scaling process shown in FIG. 10 is executed when the image editing process shown in FIG. 3 employs a scaling editing as an image editing method, and the scaling editing has been selected.

When the scale editing is started, the image editing application 27 displays the scaling edit screen in S510. In the example shown in FIG. 10, it is assumed that the scaling edit screen has the same contents as the movement edit screen 80 has (FIG. 9A) and description on the scaling process will be made referring to FIG. 9A. It is noted that the corner icons may be or may not be displayed in the scaling edit screen.

In S520, the image editing application 27 determines whether two desired positions in the edit target image 62 are simultaneously indicated based on the indicator information supplied by the OS 26. It is noted that, in the scaling process shown in FIG. 10, the two indicators respectively indicating two positions on the edit target image 62 will be referred to as the first indicator and the second indicator.

When the image area is not indicated with the first indicator or the second indicator simultaneously, the image editing application 27 determines whether the finish button 68 has been tapped (S590) based on the indicator information supplied by the OS 26. When the finish button 68 has not been tapped (S590: NO), the image editing application 27 returns to S520.

When the finish button 68 has been tapped (S590: YES), the image editing application 27 generates image data representing the edit target image data 62 of currently displayed size, and stores the same in the storage 12 in S600, besides the image data representing the original edit target image 62. With this configuration, the image subjected to the scaling edit can be handled independently from the original edit target image 62. Thus, for example, the image editing application 27 wirelessly transmits the image data representing the image subjected the scaling process to the MFP 30 for printing.

When the two desired position in the edit target image 62 are simultaneously indicated with the first indicator and the second indicator, respectively (S520: YES), the image editing application 27 proceeds to S530. In S530, the image editing application 27 determines whether the first and second indicators, which indicate the edit target image 62, are in the holding states, respectively, based on the indicator information supplied by the OS 26.

When at least one of the first indicator and the second indicator is not in the holding state (S530: NO), the image editing application 27 proceeds to S540. In S540, in accordance with moving condition of the indicator which is not in the holding state, the image editing application 27 changes the size of the edit target image 62 (i.e., magnifies or reduces the size of the edit target image 62). After execution of S540, the image editing application 27 returns to S520.

When it is determined that both the first and second indicators are in the holding state (S530: YES), the image editing application 27 proceeds to S550. In S550, the image editing application 27 determines whether the indication of the first indicator and the indication of the second indicator have been continued based on the indicator information supplied by the OS 26. When the indication of none of the first and second indicators has been continued (S550: NO), the image editing application 27 returns to S520.

When it is determined that the indications through both indicators have been continued (S550: YES), the image editing application 27 proceeds to S560. In S560, the image editing application 27 determines whether a position other than the positions respectively indicated by the first and second indicators has been tapped by a third indicator which is different from either of the first and second indicators based on the indicator information supplied by the OS 26. When it is determined that tapping with the third indicator is not performed (S560: NO), the image editing application 27 returns to S520. When it is determined that tapping with the third indicator has been performed (S560: YES), the image editing application 27 proceeds to S570, and the current size of the edit target image 62 is confirmed.

In S580, the image editing application 27 determines whether all the indicators which indicate on positions of the touch panel 14a, have been released from the touch panel 14a based on the indicator information supplied by the OS 26. When the indication through the indicators have been continued, the image editing application 27 executes S580. When all the indicators have been released from the touch panel 14a and no indications are made on the touch panel 14a at all, the image editing application 27 returns to S520.

According to the scaling process shown in FIG. 10, when the user adjusts the size of the image with use of two indicators, the user can confirm the adjusted size with keeping the two indicators in the holding state. Therefore, the user can receive the image of the desired size efficiently.

It is noted that the operation method to setting the angles in the rotation editing using the slider 76 as shown in FIG. 7 is only an example, and another method may be employed. For example, two indicators are simultaneously operated such that the two indicated positions move in opposite rotational directions, and the image may be rotated in response to the opposite rotational movements of the two indicated positions.

It is noted that detection of the operated positions based on the detection signals output by the touch panel 14a need not be limited to the configuration described above. For example, the image editing application 27 (but not the OS 26) may detect the positions based on the detection signals output by the touch panel 14a. Regarding displaying of images on the display 15, it is not necessary to display the image through the OS 26 as described above, but the image editing application 27 may display the images on the display 15 not through the OS 26.

Further, a function realized by one component in the illustrative embodiment may be realized by a plurality of components, or functions realized by a plurality of components in the illustrative embodiment may be realized by an integrated single component. Further, at least a part of components in the illustrative embodiment may be replaced with known configuration having the same function. A part of the configuration according to the illustrative embodiment may be omitted. Furthermore, at least a part of the configuration of the illustrative embodiment may replace a similar configuration of other embodiments, and at least a part of the configuration of the illustrative embodiment may be added to other configuration.

What is claimed is:

1. A non-transitory computer-readable storage of an information processing apparatus having a display, a touch panel overlaid on a display area of the display and configured to detect an indicating operation by multiple indicators, the multiple indicators comprising a first indicator and a second indicator and output a detection signal of the indicating operation, the indicating operation being at least one of a contact and a closely located state of each of the multiple indicators with respect to the touch panel, a data storage configured to store image data, and a controller, the storage storing instructions to be executed by the controller,
wherein the instructions, when executed by the controller, cause the information processing apparatus to:
display on the display an image represented by the image data stored in the data storage;
edit the image displayed on the display in accordance with the indicating operation by the first indicator;
determine whether the first indicator is in a holding state, the holding state being a state where the first indicator is maintained to indicate a position on the touch panel while the touch panel detects the indicating operation by the first indicator;
when it is determined that the first indicator is in the holding state, determine whether the second indicator makes a particular indicating operation at an other position, which is different from the position indicated by the first indicator in the holding state; and
when it is determined that the particular indicating operation has been made to the other position by the second indicator while the first indicator being in the holding state, complete the edit of the image, which is currently displayed on the display as an edited image, according to the indicating operation by the first indicator;
wherein the touch panel is configured to output the detection signal when an indication through at least one of the first indicator and the second indicator is detected,
wherein the instructions further cause the information processing apparatus to:
determine whether the detection signal is received from the touch panel after completion of the edited image; and
enable re-execution of editing of the image in response to a determination that there is no indicating operation from either the first indicator or the second indicator after completion of the edited image.

2. The non-transitory computer-readable storage according to claim 1, wherein the instructions further cause the information processing apparatus to receive a moving speed of the first indicator and determines that the first indicator is in the holding state when the moving speed as received is equal to or less than a particular judging speed.

3. The non-transitory computer-readable storage according to claim 1,
wherein the touch panel is configured to output a particular signal when either the first indicator or the second indicator contacts the touch panel at a strength equal to or greater than a particular strength threshold, and
wherein the instructions further cause the information processing apparatus to determine that the particular indicating operation is made to the other position when the particular signal received from the touch panel.

4. The non-transitory computer-readable storage according to claim 1,
wherein editing of the image is configured to use one of a plurality of editing methods, and
wherein the instructions further cause the information processing apparatus to:
display a selection screen enabling a user to select one of the plurality of editing methods; and
receive a selection operation on the selection screen to select one of the plurality of editing methods,
wherein the editing of the image is executed using the one of the plurality of editing methods as received selecting operation.

5. The non-transitory computer-readable storage according to claim 1,
wherein editing of the image is configured to use one of a plurality of editing methods,
wherein the plurality of editing methods includes a crop editing extracting an image of a particular area within the entire image subject to editing, and
wherein the instructions further cause the information processing apparatus to display a frame line surrounding the particular area in a manner overlaid on the displayed image when the editing method is the crop editing, in response to movement of the first indicator which indicates a particular portion of the frame line, the particular area being changed in accordance with a moving amount and a moving direction of the first indicator.

6. The non-transitory computer-readable storage according to claim 1,
wherein editing of the image is configured to use one of a plurality of editing methods,
wherein the plurality of editing methods includes a rotation editing rotating an image subject to editing,
wherein the instructions further cause the information processing apparatus to display an angle setting image when the editing method is the rotation editing method, a rotation angle of the image being changed in accordance with the indicated position of either the first indicator or the second indicator within the angle setting image, and
wherein, when the editing method is the rotation editing, in response to movement of either the first indicator or the second indicator within the angle setting image with an position indicating state of either the first indicator or the second indicator being maintained, the controller rotates the image subjected to editing in accordance with a position indicated by either the first indicator or the second indicator.

7. The non-transitory computer-readable storage according to claim 1,
wherein editing of the image is configured to use one of a plurality of editing methods, wherein the plurality of editing methods includes a movement editing moving a position of an image subject to editing, and
wherein, when the editing method is the movement editing, in response to movement of the first indicator with an indicating state of the first indicator to indicate the image as displayed being maintained, the controller moves the image in accordance with a moving amount and a moving direction of the first indicator.

8. The non-transitory computer-readable storage according to claim 1,
wherein editing of the image is configured to use one of a plurality of editing methods,
wherein the plurality of editing methods includes a scaling editing magnifying/reducing an image subject to editing by moving at lest one of multiple indicators which simultaneously indicate multiple positions on the touch panel, and
wherein, when the editing method is the scaling editing, in response to movement of at least one of multiple indicators which simultaneously indicate multiple positions on the touch panel with the indicating state being maintained, the controller magnifies/reduces the image subject to editing in accordance with a moving amount and a moving direction of the at least one of multiple indicators.

9. An information processing apparatus, comprising:
a display;
a touch panel overlaid on a display area of the display and configured to detect an indicating operation by multiple indicators, the multiple indicators comprising a first indicator and a second indicator and output a detection signal of the indicating operation, the indicating operation being at least one of a contact and a closely located state of each of the multiple indicators with respect to the touch panel;
a data storage configured to store image data; and
a controller,
wherein the controller is configured to:
display an image represented by the image data stored in the data storage;
edits the image displayed on the display in accordance with the indicating operation by the first indicator;
determine whether the first indicator is in a holding state, the holding state being a state where the first indicator is maintained to indicate a position on a surface of the touch panel while the touch panel detects the indicating operation by the first indicator;
when it is determined that the first indicator is in the holding state, determine whether the second indicator makes a particular indicating operation at an other position, which is different from the position indicated by the first indicator in the holding state; and
when it is determined that the particular indicating operation has been made to the other position by the second indicator while the first indicator being in the holding state, the controller completes the edit of the image, which is currently displayed on the display, according to the indicating operation by the first indicator,
wherein the touch panel is configured to output the detection signal when an indication through at least one of the first indicator and the second indicator is detected,
wherein the instructions further cause the information processing apparatus to:

determine whether the detection signal is received from the touch panel after completion of the edited image; and enable re-execution of editing of the image in response to a determination that there is no indicating operation from either the first indicator or the second indicator after completion of the edited image.

10. An information processing method, which is employed in an information processing apparatus having a display, a touch panel overlaid on a display area of the display and configured to detect an indicating operation by multiple indicators, the multiple indicators comprising a first indicator and a second indicator and output a detection signal of the indicating operation, the indicating operation being at least one of a contact and a closely located state of each of the multiple indicators with respect to the touch panel, and a data storage configured to store image data, comprising:

displaying an image represented by the image data stored in the data storage;

editing the image displayed on the display in accordance with the indicating operation by the first indicator; and determining whether the first indicator is in a holding state, the holding state being a state where the first indicator is maintained to indicate a position on a surface of the touch panel while the touch panel detects the indicating operation by the first indicator, when it is determined that the first indicator is in the holding state, determining whether the second indicator makes a particular indicating operation at an other position, which is different from the position indicated by the first indicator in the holding state; and when it is determined that the particular indicating operation has been made to the other position by the second indicator while the first indicator being in the holding state, complete the edit of the image, which is currently displayed on the display, according to the indicating operation by the first indicator, wherein the touch panel is configured to output the detection signal when an indication through at least one of the first indicator and the second indicator is detected, wherein the instructions further cause the information processing apparatus to:

determine whether the detection signal is received from the touch panel after completion of the edited image; and enable re-execution of editing of the image in response to a determination that there is no indicating operation from either the first indicator or the second indicator after completion of the edited image.

11. The non-transitory computer-readable storage according to claim 1, wherein the instructions further cause the information processing apparatus to, when it is determined that the particular indicating operation has been made to a position within the image edited according to the indicating operation by the first indicator while the first indicator being in the holding state, complete the edit of the image.

12. The non-transitory computer-readable storage according to claim 1,
wherein editing of the image is configured to use one of a plurality of editing methods, wherein the plurality of editing methods includes a crop editing extracting an image of a particular area within the entire image subject to editing, and wherein when the editing method is the crop editing, the controller is configured to adjust the particular area after an indicating operation by the first indicator is determined on a corner icon of the frame line.

13. The non-transitory computer-readable storage according to claim 12, wherein when the editing method is the crop editing, the controller is configured to display a larger corner icon after an indicating operation by the first indicator is determined on the corner icon.

14. The apparatus according to claim 9, wherein the instructions further cause the controller to, when it is determined that the particular indicating operation has been made to a position within the image edited according to the indicating operation by the first indicator while the first indicator being in the holding state, complete the edit of the image.

15. The apparatus according to claim 9,
wherein editing of the image is configured to use one of a plurality of editing methods, wherein the plurality of editing methods includes a cru editing extracting an image of a particular area within the entire image subject to editing, and wherein when the editing method is the crop editing, the controller is configured to adjust the particular area after an indicating operation by the first indicator is determined on a corner icon of the frame line.

16. The apparatus according to claim 15, wherein when the editing method is the crop editing, the controller is configured to display a larger corner icon after an indicating operation by the first indicator is determined on the corner icon.

17. The method according to claim 10, wherein the instructions further cause the information processing apparatus to, when it is determined that the particular indicating operation has been made to a position within the image edited according to the indicating operation by the first indicator while the first indicator being in the holding state, complete the edit of the image.

18. The method according to claim 10,
wherein editing of the image is configured to use one of a plurality of editing methods, wherein the plurality of editing methods includes a crop editing extracting an image of a particular area within the entire image subject to editing, and wherein when the editing method is the crop editing, the controller is configured to adjust the particular area after an indicating operation by the first indicator is determined on a corner icon of the frame line.

19. The method according to claim 18, wherein when the editing method is the crop editing, the controller is configured to display a larger corner icon after an indicating operation by the first indicator is determined on the corner icon.

* * * * *

UNITED STATES PATENT AND TRADEMARK OFFICE
CERTIFICATE OF CORRECTION

PATENT NO. : 10,705,697 B2  
APPLICATION NO. : 15/467008  
DATED : July 7, 2020  
INVENTOR(S) : Naoki Kusumoto Page 1 of 1

It is certified that error appears in the above-identified patent and that said Letters Patent is hereby corrected as shown below:

In the Claims

Column 22, Claim 15, Line 26 should read:
wherein the plurality of editing methods includes a crop Signed and Sealed this
Twenty-seventh Day of June, 2023

Katherine Kelly Vidal  
*Director of the United States Patent and Trademark Office*